United States Patent
d'Aquin

(12) 
(10) Patent No.: US 6,634,834 B1
(45) Date of Patent: Oct. 21, 2003

(54) TRANSPORTING SULFUR PELLETS

(76) Inventor: Gerard E. d'Aquin, 1957 E. 35$^{th}$ Pl., Tulsa, OK (US) 74105

( * ) Notice: Subject to any disclaimer, the term of this patent is extended or adjusted under 35 U.S.C. 154(b) by 0 days.

(21) Appl. No.: 10/114,204

(22) Filed: Apr. 2, 2002

(51) Int. Cl.$^7$ .............................................. B65G 53/28
(52) U.S. Cl. ...................... 406/106; 406/155; 209/906; 414/139.4
(58) Field of Search ................................ 406/197, 106, 406/155; 209/906; 414/135.4

(56) References Cited

U.S. PATENT DOCUMENTS

| | | | | |
|---|---|---|---|---|
| 2,361,253 A | * | 10/1944 | Wiegand | 83/46 |
| 3,443,837 A | * | 5/1969 | Meyer et al. | 302/14 |
| 3,761,136 A | * | 9/1973 | Every | |
| 3,948,565 A | * | 4/1976 | Horvath | 302/66 |
| 4,234,318 A | * | 11/1980 | Higgins | |
| 4,595,350 A | * | 6/1986 | Harbolt | |
| 4,758,332 A | * | 7/1988 | Capes | |
| 4,952,307 A | * | 8/1990 | Adamache | |
| 5,169,267 A | * | 12/1992 | Cowper | 406/49 |
| 5,250,196 A | * | 10/1993 | Bosch | |
| 5,436,384 A | * | 7/1995 | Grant | |
| 5,609,256 A | * | 3/1997 | Mankosa | |

* cited by examiner

Primary Examiner—Joseph A. Dillon
(74) Attorney, Agent, or Firm—B. G. Colley

(57) ABSTRACT

A process and apparatus for effecting the transportation of sulfur pellets with the recovery of sulfur fines is disclosed. This is accomplished by a combination of steps and apparatus which include pumping water from a water supply into solid sulfur pellets with a jet-venturi/eductor pumping system to produce a sulfur water slurry containing sulfur pellets and sulfur fines, pumping the sulfur water slurry with one or more rotating disk/boundary layer pumps to a series of static screens to remove large lumps and impurities, a sulfur fines slurry, and a washed sulfur pellet slurry, contacting the sulfur pellet slurry with a dewatering disk to remove substantially all the remaining water, transporting the dewatered sulfur pellets to storage, pumping the sulfur fines slurry to a hydrocyclone to separate all the water from the sulfur fines, recycling the recovered water to said water supply following the addition of an alkaline neutralizing agent when needed, and recovering the sulfur fines.

The invention substantially reduces air pollution by reducing the amount of sulfur fines released into the air during the unloading of sulfur pellets in bulk. The hydraulic transportation feature of this invention eliminates the use of mechanical loaders, cranes, open air hoppers, and open air transfer points that normally create and disperse sulfur fines into the atmosphere during their use in the movement of solid sulfur. It enables sulfur pellet transfer operations to take place in most weather conditions, rather than requiring interruption when wind speed and time exceed regulatory guidelines. The State of Florida requires operators to cease the unloading of sulfur pellets from a marine vessel whenever wind speed exceeds 18 miles per hour for a 5-minute time span.

8 Claims, 1 Drawing Sheet

TRANSPORTING SULFUR PELLETS

This is a divisional of application Ser. No. 09/492,915, filed Jan. 24, 2000 since patented as U.S. Pat. No. 6,368,029.

BACKGROUND OF THE INVENTION

The Frasch process can be used to obtain sulfur from the ground wherein air and superheated water is injected into subterranean sulfur deposits to melt the sulfur and force it to the surface. Elemental sulfur may also be obtained in large quantities from hydrogen sulfide contained in petroleum refinery gas streams or wellhead gas. In the U.S., elemental sulfur is generally transported from field storage to users sites in the molten state due to environmental and specification considerations. In Canada and other parts of the world, however, molten sulfur at the field distributing plant may be pelleted or pumped onto concrete pads open to the atmosphere or into slip forms, for storage whereupon the molten sulfur solidifies into large slabs. The slabs of sulfur must either be mechanically broken up, re-liquefied, or re-liquefied and pelleted for final distribution to the consumer. The breaking-up operation is cumbersome and entails much labor and expense, and the resulting sulfur, which is extremely friable, contains a huge volume of sulfur dust or fines comprised of small particles having a high surface area which almost always cause significant environmental harm due to deposition on surrounding equipment, land and vegetation. This has led to the banning of the transport, storage and use of such "crushed bulk" sulfur in many parts of the world. It is well known that molten sulfur may also be solidified into prills, granules, or pellets by the use of prilling towers, granulators, pelletizers, pastillers and the like as shown in U.S. Pat. Nos. 4,234,318 and 4,595,350, and many more similar patents. Such "sulfur pellets" are far easier to transport and handle in bulk than "crushed bulk," and that is the reason such types of pellets were developed. Various types of sulfur pellets are the preferred form in which most solid sulfur is transported by ocean vessel to consumers throughout the world. Despite their superiority over "crushed bulk", all types of sulfur pellets retain solid sulfur's inherent characteristic of becoming increasingly brittle as it "cures" over time. Accordingly, the handling of all sulfur pellets products in bulk can generate considerable sulfur fines, which, in turn, may cause significant environmental harm. Materials handling procedures for sulfur pellets are therefore subject to stringent requirements. The State of Florida (Rule 62-296, F.A.C), for example, requires the use of special unloading facilities and procedures, which increase both the capital and operating costs of sulfur pellet handling and storage activity, particularly when dealing with vessel unloading. As part of the Rule, Florida requires the cessation of marine unloading operations whenever wind speed at the dock exceeds 18 mph for a 5-minute period.

As is the case with any form of solid sulfur, sulfur pellets and the attendant sulfur fines can readily be contaminated with *Thiobacillus thiooxidans*. This bacillus generates sulfuric acid as part of its life cycle. Sulfuric acid, which often exists in sulfur pellets at concentrations that can exceed 1,000 ppm, is a contaminant which can cause severe corrosion damage to receiving and processing facilities (current industry norms on loading a vessel with sulfur pellets call for "free acid" (sulfuric) not to exceed 100 ppm.) All forms of solid sulfur transported by sea run the additional risk of contamination by hydrochloric acid. Hydrochloric acid is formed by contact of sulfuric acid with seawater or salt. The presence of hydrochloric acid in solid sulfur can have truly catastrophic consequences on processing equipment, as most metals impervious to sulfuric acid are not impervious to hydrochloric acid. Therefore, large solid sulfur processing facilities receiving sea-borne sulfur incur the added cost of neutralizing such acids prior to melting the sulfur. The resultant ash waste must then be filtered from the molten sulfur stream using steam jacketed, diatomaceous earth, pressure leaf filters. This represents further capital, operating and waste disposal costs.

Shipments of solid sulfur pellets via railcars and vessels are sometimes contaminated with extraneous materials such as sand, rocks, organic and metallic materials. All of these contaminants cause processing problems, from degrading sulfur purity, frequent and costly cleanouts of filter leafs and sump pumps to breaking pump impellers.

It is known from U.S. Pat. No. 3,761,136 that sulfur can be formed into prills and transported through a pipeline by forming a slurry of sulfur prills and water and pumping the slurry through the pipeline. However, this technique also generates and transports undesirable sulfur fines.

SUMMARY OF THE INVENTION

The invention is a process and apparatus for hydraulically transporting sulfur pellets with minimal degradation of the pellets while allowing the removal of sulfur fines, extraneous impurities and the ability to neutralize acids as needed. It is comprised of the steps of pumping water from a water supply into a quantity of said sulfur pellets and sulfur fines with a jet-venturi-eductor-pumping system to produce a water slurry containing sulfur pellets and sulfur fines, pumping said water slurry with one or more rotating disk-boundary layer pumps to a series of static screens to separate from said water slurry large lumps, coarse impurities, and a sulfur fines slurry, to yield the desired sulfur pellet slurry, contacting the sulfur pellet slurry with a dewatering disk to remove substantially all the remaining water, transporting the dewatered sulfur pellets to storage, pumping the sulfur fines slurry to a hydrocyclone to separate water from the sulfur fines, recycling the recovered water to said water supply, and recovering the sulfur fines.

The apparatus comprises the combination of a first pump for pumping water from a water supply tank into a supply of sulfur pellets containing sulfur fines as a jet stream to produce a water slurry containing said sulfur pellets and sulfur fines, a second pump for pumping the water slurry upward to a series of screens with minimal disintegration of said pellets, a series of screens to separate from said water slurry large lumps and impurities, a sulfur fines slurry, and a sulfur pellet slurry, a dewatering disk to remove substantially all the remaining water from the sulfur pellet slurry, a hydrocyclone to separate substantially all the water from the sulfur fines slurry, a first tank for the recovery of said sulfur fines slurry, a third pump for pumping the sulfur fines slurry to said hydrocyclone, and a second tank for recovery of recycled water. If desired, a pH meter can be in contact with said water slurry to determine the need for additions of basic materials

BRIEF DESCRIPTION OF THE DRAWING

The drawing shows the unloading of a ship or barge using a jet venturi eductor-type pumping system to mix water with the sulfur pellets to form a sulfur slurry which can be lifted or transported and then pumped with a rotating disk-boundary layer pump to subsequent processing of the slurry to remove sulfur fines with the reuse and neutralization of the water and recovery of sulfur pellets free of sulfur fines and acidity.

DETAILED DESCRIPTION OF THE INVENTION

Figure 1:
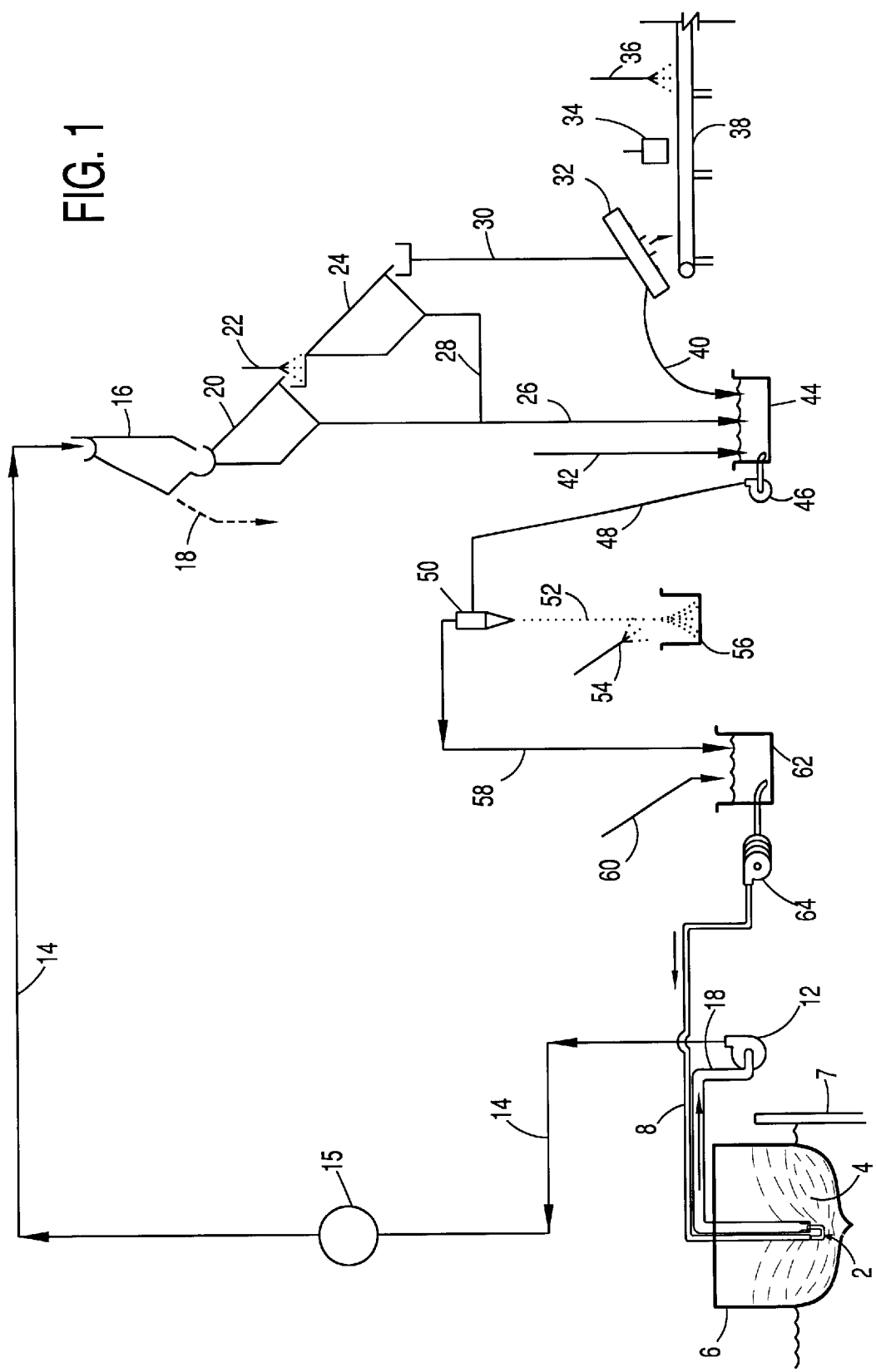

The drawing illustrates the various parts of the invention. The movable jet-venturi/eductor-type pumping system 2 directs water into the sulfur pellets 4 in the hold of the ship or barge 6, which is at the dock 7. It is to be understood that the invention is applicable to any large quantity of sulfur pellets in some type of fixed or transportable container such as a boat, railroad car, tank, pit or cavern.

The water mixes with the pellets 4 to form a sulfur slurry, which flows through the flexible pipe 10 and to a rotating disk/boundary layer pump 12. Only one pump is shown but more can be added if needed. The pump 12 sends the slurry into the pipeline 14 and through a pH meter 15. The pH of the slurry is monitored by the pH meter and when the slurry becomes acidic, the pH is brought within the desired range by the periodic additions of solutions of sodium hydroxide, calcium hydroxide or similar basic products by pipeline 42.

The sulfur slurry goes to a coarse screen 16 where the coarse lumps and impurities, such as rocks, are taken out in the overflow line 18. The sulfur slurry then flows into a dewatering screen 20 where the bulk of the water and a sulfur fines slurry are separated out. The bulk of the water flows into line 26. Wash water is then added to the sulfur pellets by means of pipeline 22 with its spray head to provide for a water wash. The sulfur pellets move to a second dewatering screen 24 where a large part of the remaining water and any remaining fines are removed. Such water and fines flow by line 28 into pipeline 26. The desired, rinsed or washed, partially dewatered sulfur pellet stream is transferred by line 30 to a dewatering disk 32 where substantially all the remainder of the water is removed. The sulfur pellets are moved to storage via conveyor belt 38. If desired, one or more magnetic separators 34 may be positioned above the conveyor belt to remove unwanted scraps of iron or steel such as nails, bolts, and the like. A bactericide or preservative, such as sodium lauryl sulfate, may be added to inhibit the growth of bacteria on the sulfur pellets. It is mixed with the sulfur pellets by pipeline 36 with its spray head. Basic agents to control the sulfur slurry acidity are added and mixed into tank 44 via line 42 as needed. A retrievable magnetic separator (not shown) may be placed into tank 44 if desired to pickup iron or steel contaminates. The sulfur fines slurry in tank 44 is pumped by a low pressure pump 46 into pipe 48 and into a hydrocyclone 50 where the sulfur fines are separated from the water. The damp or wet sulfur fines are discharged from the hydrocyclone underflow via the sulfur fines stream 52 to a storage bin 56 for eventual use or disposal. As in the case of the sulfur pellets, a preservative such as sodium lauryl sulfate may be added by line 54 with its spray head prior to storage. The hydrocyclone overflow water is recycled by pipe 58 to a water tank 62 and make up water is added to the water tank 62 by means of the water supply line 60. Water from tank 62 is pumped by means of the high-pressure water pump 64 through the line 8 and into the jet-eductor pumping system 2.

The invention substantially reduces air pollution by virtually eliminating the release of sulfur fines into the air during the unloading of sulfur pellets in bulk form. The hydraulic transportation feature of this invention eliminates the use of mechanical loaders, cranes, open-air hoppers, conveyers and open air transfer points ands chutes that normally disperse sulfur fines into the ambient air during the movement of sulfur pellets. In addition to environmental benefits, the lack of exposed sulfur dust on metal and concrete structures reduces related maintenance expenditures. The ability to neutralize acid buildup in the sulfur and to wash away the resultant impurities rather than using the standard molten sulfur liming and diatomaceous earth filtration process also reduces capital and operating costs, sulfur losses in the filter-cake waste and the need to dispose of a potentially harmful environmental waste.

I claim:

1. Apparatus which hydraulically transports a mixture of sulfur pellets, sulfur fines and coarse impurities with the removal of sulfur, which comprises the combination of:
   a) a first pump for pumping water from a water supply tank into a supply of said mixture as a jet stream to produce a water slurry containing said sulfur pellets and sulfur fines,
   b) a second pump for pumping the water slurry upward to a series of screens,
   c) a series of screens to separate from said water slurry, large lumps, coarse impurities, and a sulfur fines slurry, to yield the desired sulfur pellet slurry,
   d) a dewatering disk to remove substantially all the remaining water from the sulfur pellet slurry,
   e) a hydrocyclone to separate substantially all the water from the sulfur fines slurry,
   f) a first tank for the recovery of said sulfur fines slurry,
   g) a third pump for pumping the sulfur fines slurry to said hydrocyclone, and
   h) a second tank for recovery of recycled water.

2. The apparatus as set forth in claim 1, which comprises in addition one or more magnetic separators to remove iron or steel impurities.

3. The apparatus as set forth in claim 1, which comprises in addition, a water sprayer to wash the sulfur pellets.

4. The apparatus as set forth in claim 1, which comprises in addition, a preservative sprayer to preserve the sulfur pellets.

5. Apparatus which hydraulically transports a mixture of sulfur pellets, sulfur fines and coarse impurities and with the control of acidity, which comprises the combination of:
   a) a first pump for pumping water from a water supply tank into a supply of said mixture as a jet stream to produce a water slurry containing said sulfur pellets and sulfur fines,
   b) a second pump for pumping the water slurry upward to a series of screens,
   c) a series of screens to separate from said water slurry large lumps and impurities, a sulfur fines slurry, and a resultant sulfur pellet slurry,
   d) a dewatering disk to remove substantially all the remaining water from the sulfur pellet slurry,
   e) a hydrocyclone to separate substantially all the water from the sulfur fines slurry,
   f) a first tank for the recovery of said sulfur fines slurry,
   g) a third pump for pumping the sulfur fines slurry to said hydrocyclone,
   h) a second tank for recovery of recycled water, and
   i) a pH meter in contact with said water slurry to determine the need for additions of basic materials.

6. The apparatus as set forth in claim 5, which comprises in addition, one or more magnetic separators to remove iron or steel impurities.

7. The apparatus as set forth in claim 5, which comprises in addition, a water sprayer to wash the sulfur pellets.

8. The apparatus as set forth in claim 5, which comprises in addition, a preservative sprayer to preserve the sulfur pellets.

* * * * *